V. A. FYNN.
DYNAMO ELECTRIC MACHINE.
APPLICATION FILED MAY 23, 1911.

1,044,640.

Patented Nov. 19, 1912.

3 SHEETS—SHEET 1.

WITNESSES:
L. L. Mead
W. A. Alexander.

INVENTOR
Valère A. Fynn
BY
E. E. Hoffman
ATTORNEY

V. A. FYNN.
DYNAMO ELECTRIC MACHINE.
APPLICATION FILED MAY 23, 1911.

1,044,640.

Patented Nov. 19, 1912.
3 SHEETS—SHEET 2.

WITNESSES:
L. L. Mead
W. A. Alexander

INVENTOR
Valère A. Fynn
BY E. E. Huffman
ATTORNEY

V. A. FYNN.
DYNAMO ELECTRIC MACHINE.
APPLICATION FILED MAY 23, 1911.

1,044,640.

Patented Nov. 19, 1912.

3 SHEETS—SHEET 3.

WITNESSES:
L. L. Mead,
W. A. Alexander

INVENTOR
Valère A. Fynn
BY E. E. Huffman
ATTORNEY

UNITED STATES PATENT OFFICE.

VALÈRE ALFRED FYNN, OF LONDON, ENGLAND.

DYNAMO-ELECTRIC MACHINE.

1,044,640.  Specification of Letters Patent.  Patented Nov. 19, 1912.

Application filed May 23, 1911. Serial No. 628,899.

*To all whom it may concern:*

Be it known that I, VALÈRE ALFRED FYNN, a subject of the King of England, residing at London, England, have invented a certain new and useful Dynamo-Electric Machine, of which the following is such a full, clear, and exact description as will enable any one skilled in the art to which it appertains to make and use the same, reference being had to the accompanying drawings, forming part of this specification.

My invention relates to a dynamo electric machine capable of being operated as a direct current motor, and also as a converter. It is particularly applicable to machines intended for propelling vehicles driven by a storage battery.

My invention will be better understood by reference to the following description taken in conjunction with the accompanying drawings in which—

Figure 1:
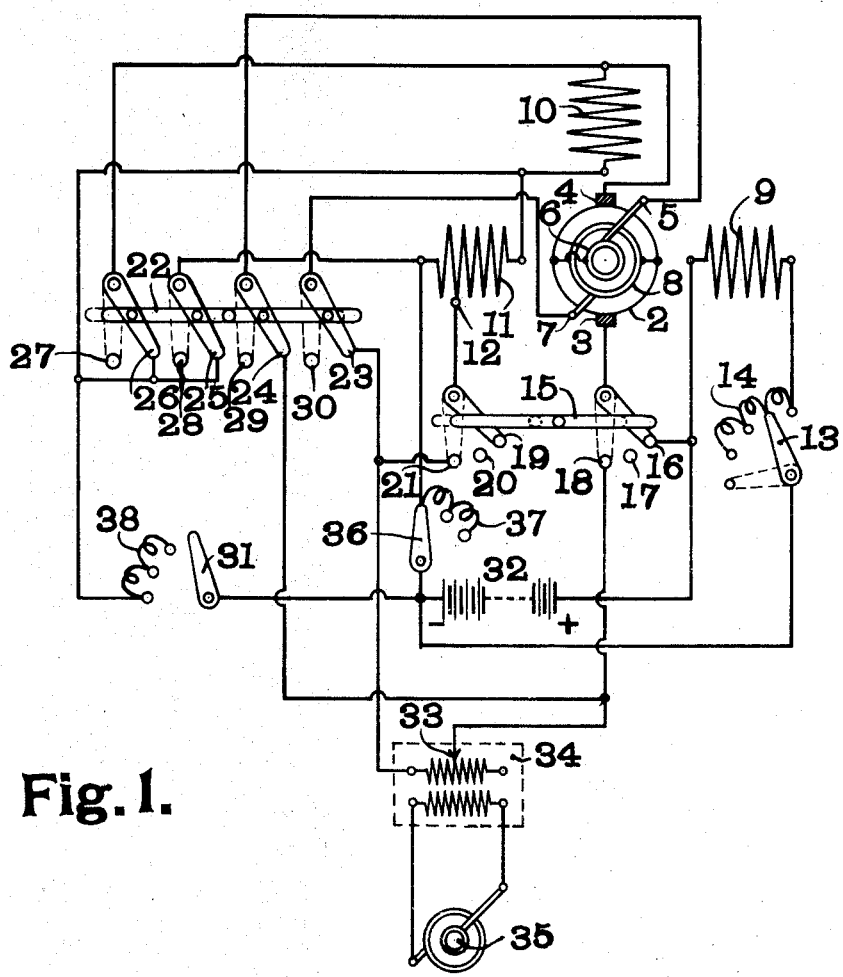
Figure 2:
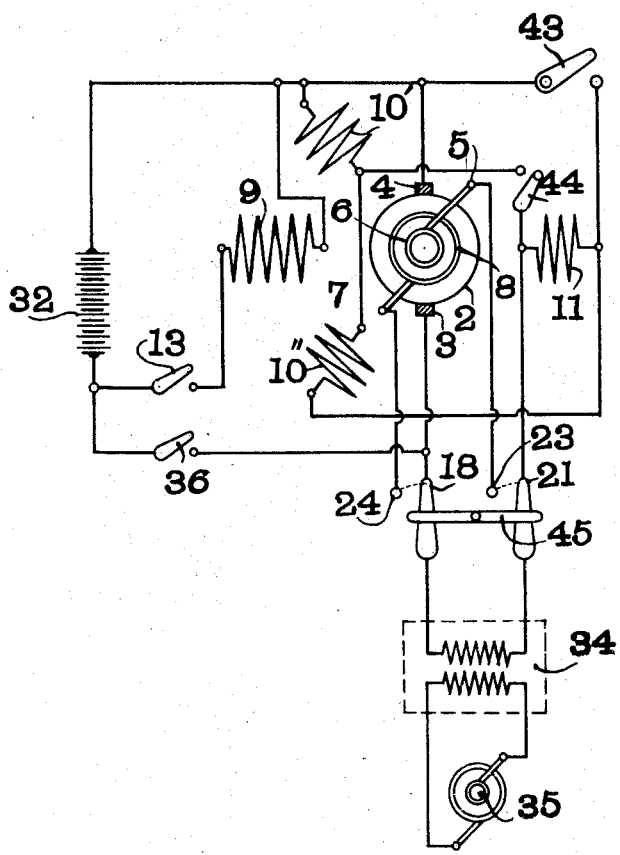

Figure 1 is a diagrammatic representation of a dynamo electric machine embodying the distinctive features of this invention, and it also shows the various circuits and the necessary changes in the connections; Fig. 2 shows a modified arrangement of the windings and Fig. 3 illustrates details of the mechanical structure of the machine.

Figure 3:
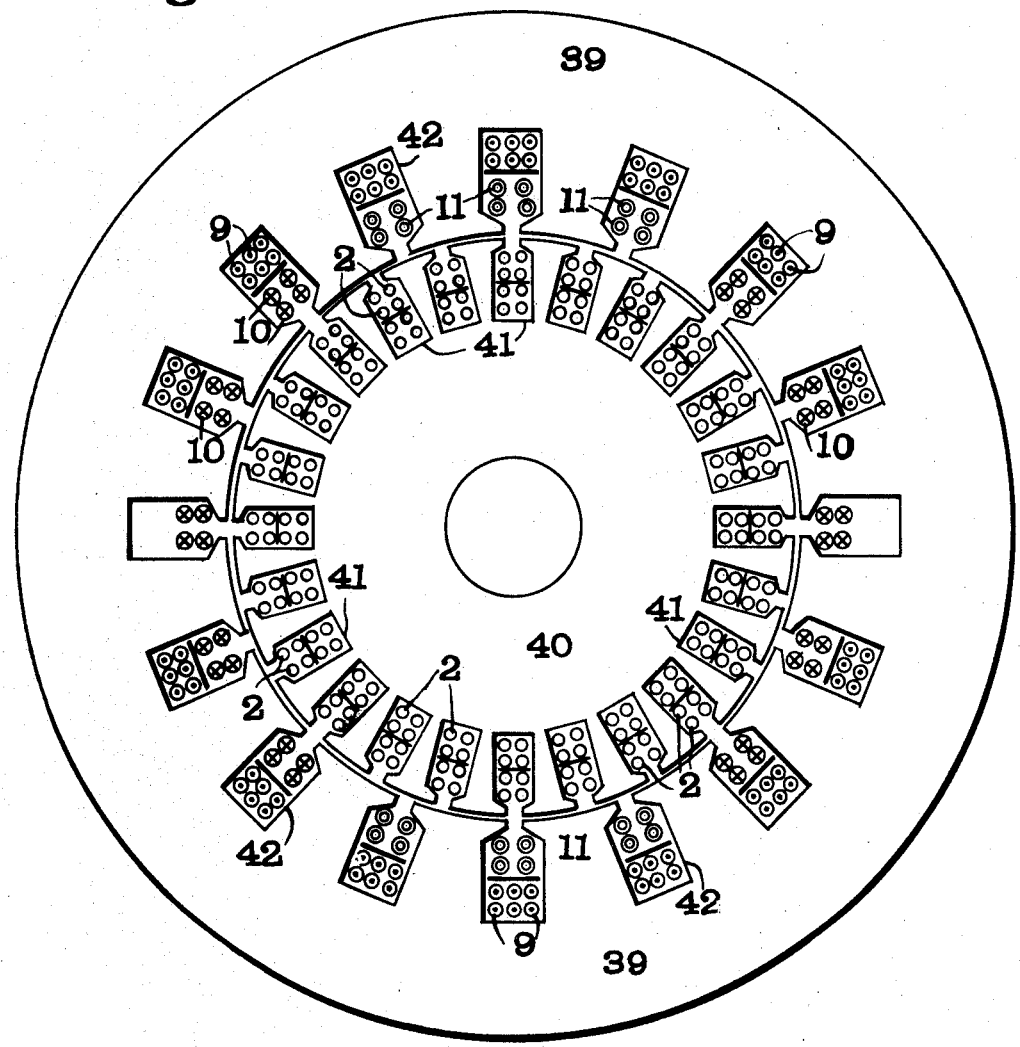

Referring to Fig. 1, the revolving part, the preferred form of which is shown in more detail in Fig. 3, is identified by the numeral 40, and has no distinct polar projections. This rotor carries a winding 2 connected to a commutator (not shown) and to slip rings 6, 8. Brushes 3, 4 rest on the commuted winding 2, or on the commutator when one is used, and are connected in series with a neutralizing winding 10 disposed co-axially with the brush line 3, 4 and to the series field winding 11 displaced by 180/n degrees from 10. The letter "n" stands throughout for the number of poles of the machine. Another exciting winding 9 is disposed co-axially with 11 and is adapted to produce a uni-directional shunt excitation. The windings 9, 10 and 11 are disposed on the stationary member the preferred form of which has no defined polar projections and is more clearly shown at 39 in Fig. 3.

According to my invention I make use of the commuted winding 2 connected in series with the neutralizing winding 10 and the series exciting winding 11 for the purpose of operating the machine as a series neutralized, direct current motor for propelling the vehicle, and I make use of the shunt winding 9 connected to the source of direct current for the purpose of imparting a shunt characteristic to the machine thus enabling it to operate as a generator above certain speeds, for instance when being driven by the inertia of the vehicle, and of either returning energy to the source or of dissipating same in resistances, thus retarding the motion of the vehicle in either case. I further provide means whereby these very same elements can be so grouped as to be used for the purpose of starting the machine from an alternating current source and for operating same as a converter, particularly for the purpose of taking energy from the alternate current source transforming the same into direct current and making use of that current for the purpose of charging the storage battery previously used for the purpose of propelling the vehicle.

The changes in the circuits which are necessary for the aforesaid purposes are shown in Fig. 1. The position of the switches 13, 15, 22, 31 and 36 shown in that figure is the one which is suitable for operating the machine as a converter. The source of alternating current is indicated at 35, an adjustable transformer 34 being usually interposed between that source and the converter. From the secondary of the transformer 34 the current flows to contact 23, to brush 7, to slip rings 8, through rotor winding 2, to the slip ring 6, the brush 5, the contact 24, and back to the secondary of the transformer by way of the adjustable contact 33. The neutralizing winding 10 and the series field winding 11 are both short-circuited by means of those blades of switch 22 which stand on the points 25 and 26.

The uni-directional magnetization of the converter is provided by the shunt winding 9 controlled by the shunt regulator 13, 14. The brushes 3, 4 of the converter are connected to the battery 32; brush 3 being for instance connected to the positive pole of said battery by means of one blade of switch 15 and contact 16, while brush 4 is connected to the negative pole by way of the contacts 26 and 25, two blades of switch 22 and by way of the starting switch 36.

When the storage battery is fully charged then switch 22 should be placed in its "off" position bringing its four blades onto points 27, 28, 29 and 30. Energy is now supplied to the machine from the storage battery 32 and the circuits can be traced as follows: From the positive pole of battery 32 the current flows through the shunt winding 9 and back to the negative pole by way of shunt regulator 13, 14. It also flows through contact 16, to brush 3, through rotor winding 2, to the brush 4, through the neutralizing winding 10 and the series field winding 11, back to the negative pole of the storage battery. When the machine operates as a direct current motor this shunt excitation gives it a shunt characteristic and it also enables the machine to operate as a direct current generator whenever driven beyond a speed which is determined by the magnitude of the shunt excitation and the E. M. F. of the source of direct current. When the shunt characteristic is no longer required then switch 13 can be placed in its off position thus disconnecting the shunt winding 9, and the speed of the motor can be regulated by adjusting by means of the switch 31 the resistance 38 which is connected in parallel to the series field winding 11. The speed of the machine when operating on a direct current motor can also be regulated by means of the switch 36 co-acting with the resistance 37. Switch 36 and resistance 37 are also made use of when it is desired to start the machine as a direct current motor from the battery 32.

So far the operation of the machine has been described as a converter, receiving energy from the source of alternating current and charging the storage battery 32, as a motor operated from storage battery 32, and as a direct current generator returning energy to the storage battery 32. It only remains to be shown how this machine can be easily started from rest and brought up to a sufficiently high speed from the alternating current side. To this end the switches 13 and 22 should stand in their "off" position, while switch 15 must be placed so as to make contact with the points 18 and 21. The connections then are as follows: From the adjustable contact 33 of the secondary of the transformer 34 the circuit is traced to contact 18, to brush 3, through the rotor winding 2, to brush 4, through the neutralizing winding 10, through a part of the series winding 11 to point 12 of that winding and back to the secondary of transformer 34 by way of one blade of switch 15 and contact 21. The whole of the winding 11 can be included in this circuit; the greater the number of turns of 11 which are included, the smaller the starting current and the smaller the starting torque. It will be seen that in this connection the motor will operate as a neutralized single phase, series conduction motor, the tap 12 on winding 11 being preferably so chosen that the machine will reach a maximum no-load speed a little in excess of the synchronous. When a sufficient speed has been reached and it is desired to operate the machine as a converter for the purpose of charging the battery 32, then switch 15 should be placed on points 17, 20 and switch 22 should be placed on points 23, 24, 25 and 26, after which a unidirectional excitation of suitable magnitude can be imparted to the machine by means of the shunt regulator 13, when everything will be in readiness for connecting the commutator to the storage battery, and this is done by moving the switch 15 on to points 16 and 19. The charging current can be regulated by adjusting at 32 the alternating voltage impressed on the slip rings.

Fig. 2 differs from Fig. 1 in that the neutralizing winding is divided into two groups, 10' and 10" which produce a total magnetization directed along the axis 3, 4 as long as they are connected in series relation with the commuted winding but which when short-circuited by means of switches 43, 44, form together with the short circuited field winding 11, a regular three phase winding. The figure shows the connections to be made when it is desired to start the machine as a neutralized series conduction alternate current motor. When the rotor has reached a sufficient speed, switch 45 is thrown over to points 23, 24 and switches 43, 44 are closed, thus converting the machine into an asynchronous single-phase motor. In order to enable same to operate as a converter for the purpose of charging the battery 32, the switch 13 is closed whereby a unidirectional E. M. F. appears and is maintained at the brushes 3, 4. Switch 36 can now be closed and the battery charged. When it is desired to operate the machine as a direct current motor from the battery 32, it is necessary to open switches 45, 43, 44, and switch 13 can also be opened.

Fig. 3 shows the arrangement of the magnetic circuit of my improved dynamo electric machine. 39 is the stator provided with the slots 42 in which are located the windings 9, 10 and 11 in the manner indicated. The rotor 40 is also provided with slots 41 which carry the rotor winding 2. The way in which various windings are indicated in this figure is intended merely to distinguish these windings from each other and not to show the direction of the currents. The ampere turns of the neutralizing winding 10 are preferably chosen in excess of the ampere turns of the commuted winding so as to insure a satisfactory commutation when the machine operates as a direct current generator or motor. Although only two-pole machines have been described and illustrated, this invention is of course, applicable to machines of any number of pole pairs.

Having fully described my invention, what I claim as new and desire to secure by Letters Patent of the United States is:

1. In a dynamo electric machine, the combination with a stationary member provided with a neutralizing winding, a series field winding and a shunt exciting winding, of a revolving member having slip rings and a commuted winding, the commuted winding, the series field winding and the neutralizing winding being connected in series relation when the machine is operating as a motor, means for short-circuiting the neutralizing and series field windings, and means for connecting the shunt exciting winding to the commuted winding when the machine is operating as a converter.

2. In combination, a source of direct current, a source of alternating current, a dynamo electric machine having a stationary member provided with a neutralizing winding, a series field winding and a shunt exciting winding, and a revolving member having slip rings and a commuted winding, the commuted winding, the series field winding and the neutralizing winding being normally connected in series relation and to the source of direct current, means for connecting the source of alternating current to the slip rings, means for short-circuiting the neutralizing and the series field windings, and means for connecting the shunt winding to the source of direct current.

3. In a dynamo electric machine, a stationary member having no defined polar projections and provided with a neutralizing winding, a series field winding magnetizing along an axis displaced by 90 electrical degrees from the axis of the neutralizing winding, and a shunt exciting winding approximately coaxial with the series field winding, a revolving member without defined polar projections having slip rings, a commuted winding, and brushes on the commuted winding in line with the magnetic axis of the neutralizing winding, the brushes, the series field winding and the neutralizing winding being connected in series when the machine is operating as a motor, means for short-circuiting the neutralizing and series field windings, and means for connecting the shunt exciting winding to the commuted winding when the machine is operating as a converter.

In testimony whereof, I have hereunto set my hand and affixed my seal in the presence of the two subscribing witnesses.

VALÈRE ALFRED FYNN. [L. S.]

Witnesses:
W. A. ALEXANDER,
ELIZABETH BAILEY.